United States Patent
Kondrad et al.

(12)

(10) Patent No.: US 10,173,558 B1
(45) Date of Patent: Jan. 8, 2019

(54) VEHICLE SEAT ASSEMBLY WITH DEPLOYABLE AIRBAG

(71) Applicant: Ford Global Technologies, LLC, Dearborn, MI (US)

(72) Inventors: Marcos Silva Kondrad, Macomb Township, MI (US); Johnathan Andrew Line, Northville, MI (US); Kevin Wayne Preuss, Berkley, MI (US); S. M. Akbar Berry, Windsor (CA); Benjamin Yilma, Canton, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/916,712

(22) Filed: Mar. 9, 2018

Related U.S. Application Data

(60) Provisional application No. 62/550,032, filed on Aug. 25, 2017.

(51) Int. Cl.
*B60N 2/427* (2006.01)
*B60N 2/42* (2006.01)
*B60R 21/207* (2006.01)

(52) U.S. Cl.
CPC ....... *B60N 2/42718* (2013.01); *B60N 2/4221* (2013.01); *B60N 2/4228* (2013.01); *B60N 2/4279* (2013.01); *B60R 21/207* (2013.01)

(58) Field of Classification Search
CPC .............. B60N 2/42718; B60N 2/4221; B60N 2/4228; B60N 2/4279; B60R 21/207
USPC .......................................... 297/216.19, 216.1
See application file for complete search history.

(56) References Cited

U.S. PATENT DOCUMENTS

| | | |
|---|---|---|
| 5,967,603 A | 10/1999 | Genders et al. |
| 6,045,151 A | 4/2000 | Wu |
| 6,450,573 B1 | 9/2002 | Yamaguchi et al. |
| 6,629,715 B2 | 10/2003 | Oh et al. |
| 6,637,816 B2 | 10/2003 | Pavlov et al. |
| 6,837,540 B2 | 1/2005 | Yamaguchi et al. |
| 6,896,325 B2 | 5/2005 | Takedomi et al. |
| 6,908,149 B1 | 5/2005 | Yamaguchi et al. |
| 7,478,873 B2 | 1/2009 | Al-Samarae et al. |
| 8,585,079 B2 | 11/2013 | Gorman et al. |
| 8,703,232 B2 * | 4/2014 | Stay ...................... H05K 3/107 427/108 |
| 9,132,798 B2 | 9/2015 | Yasuoka |
| 9,409,539 B2 | 8/2016 | Nagasawa et al. |

(Continued)

FOREIGN PATENT DOCUMENTS

| | | | |
|---|---|---|---|
| DE | 19938698 A1 * | 2/2001 | ........... B60N 2/0276 |
| DE | 20316865 | 2/2004 | |

*Primary Examiner* — Milton Nelson, Jr.
(74) *Attorney, Agent, or Firm* — Vichit Chea; Price Heneveld LLP

(57) ABSTRACT

A seat assembly includes a seat member having a support surface, wherein the support surface is disposed at an inclined angle from a rear portion to a front portion thereof. A seat cover covers the support surface. An airbag assembly is disposed below the seat cover at the front portion of the support surface at a thigh support region. The airbag is operable between inflated and deflated conditions, wherein the airbag assembly increases the inclined angle of the support surface when the airbag assembly is in the inflated condition.

15 Claims, 6 Drawing Sheets

(56) References Cited

U.S. PATENT DOCUMENTS

| | | |
|---:|---|---|
| 9,580,035 B2 | 2/2017 | Koelsch et al. |
| 2012/0068442 A1 | 3/2012 | Wagner |

\* cited by examiner

VEHICLE SEAT ASSEMBLY WITH DEPLOYABLE AIRBAG

CROSS REFERENCE TO RELATED APPLICATION

This application claims priority to and the benefit under 35 U.S.C. § 119(e) of U.S. Provisional Patent Application No. 62/550,032, filed on Aug. 25, 2017, entitled VECHICLE SEAT ASSEMBLY WITH DEPLOYABLE AIRBAG, the entire disclosure of which is hereby incorporated herein by reference.

FIELD OF THE INVENTION

The present invention generally relates to a vehicle seat assembly, and more particularly, to a vehicle seat assembly configured for autonomous vehicles, wherein the vehicle seat assembly does not always face a forward direction, such that safety features of the vehicle seat assembly need to be integrated into the seat assembly to accommodate the various positions a seat occupant may assume within an autonomous vehicle.

BACKGROUND OF THE INVENTION

In an impact event, "submarining" occurs when a seat occupant is forced underneath their seatbelt, which can cause severe injuries. The submarining effect can generally be mitigated with proper seat occupant restraint and augmented seat frame design. In a vehicle with moving seats which are not limited to a single location or orientation, such as within an autonomous vehicle, extra care needs to be taken to prevent submarining. Thus, a vehicle seat assembly having safety features configured to prevent submarining is desired, wherein the safety features are fully integrated into the seat assembly design, such that the safety features properly operate without regard to the location or orientation of the vehicle seat assembly within a vehicle.

SUMMARY OF THE INVENTION

According to one aspect of the present invention, a seat assembly includes a seat member having a support surface disposed at an initial inclined angle. An airbag assembly is disposed within the seat member at a thigh support region of the support surface. The airbag is operable between inflated and deflated conditions. The support surface is disposed at a second angle that is greater than the initial inclined angle when the airbag is in the inflated condition.

Embodiments of the first aspect of the invention can include any one or a combination of the following features:
- the support surface disposed at an initial inclined angle from a rear portion of the support surface to the thigh support region when the airbag assembly is in the deflated condition.
- the support surface disposed at an increased inclined angle relative to the initial inclined angle from the rear portion of the support surface to the thigh support region when the airbag assembly is in the inflated condition
- a seat cover covering the support surface.
- the seat cover including a flexible portion disposed over the thigh support region
- a seat base operably coupled to the seat member, and a pump assembly operably coupled to the airbag assembly by a supply line, wherein the pump assembly is disposed within a portion of the seat base.

According to another aspect of the present invention, a seat assembly includes a seat assembly having a seat member with a support surface, wherein the support surface is disposed at an inclined angle from a rear portion to a front portion thereof. An airbag assembly is disposed along the front portion of the support surface, and is operable between inflated and deflated conditions. The airbag assembly increases the inclined angle of the support surface in the inflated condition.

Embodiments of the second aspect of the invention can include any one or a combination of the following features:
- a pump assembly operably coupled to the airbag assembly by a supply line, a controller operably coupled to the pump assembly and configured to control the pump assembly, and a sensor system.
- the sensor system having a pre-crash detection system, such that the controller can activate the pump assembly to inflate the airbag before an impact event is detected.
- the pump assembly being configured to inflate the airbag in about 1 second
- a seat base operably coupled to the seat member, wherein the pump assembly is disposed within a portion of the seat base.
- a seat cover covering the support surface.
- the seat cover at least partially comprised of a flexible material.

According to another aspect of the present invention, a seat assembly includes a seat member having a support surface, wherein the support surface is disposed at an inclined angle from a rear portion to a front portion thereof. A seat cover covers the support surface. An airbag assembly is disposed below the seat cover at the front portion of the support surface. The airbag is operable between inflated and deflated conditions.

Embodiments of the third aspect of the invention can include any one or a combination of the following features:
- the seat cover being at least partially comprised of a flexible material.
- the seat cover retaining the airbag assembly in both the inflated and deflated conditions.
- the support surface being disposed at an increased inclined angle relative to the inclined angle when the airbag assembly is in the inflated condition.
- a pump assembly operably coupled to the airbag assembly by a supply line, a controller operably coupled to the pump assembly and configured to control the pump assembly, and a sensor system.
- a seat base operably coupled to the seat member.
- the seat base being configured to swivel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
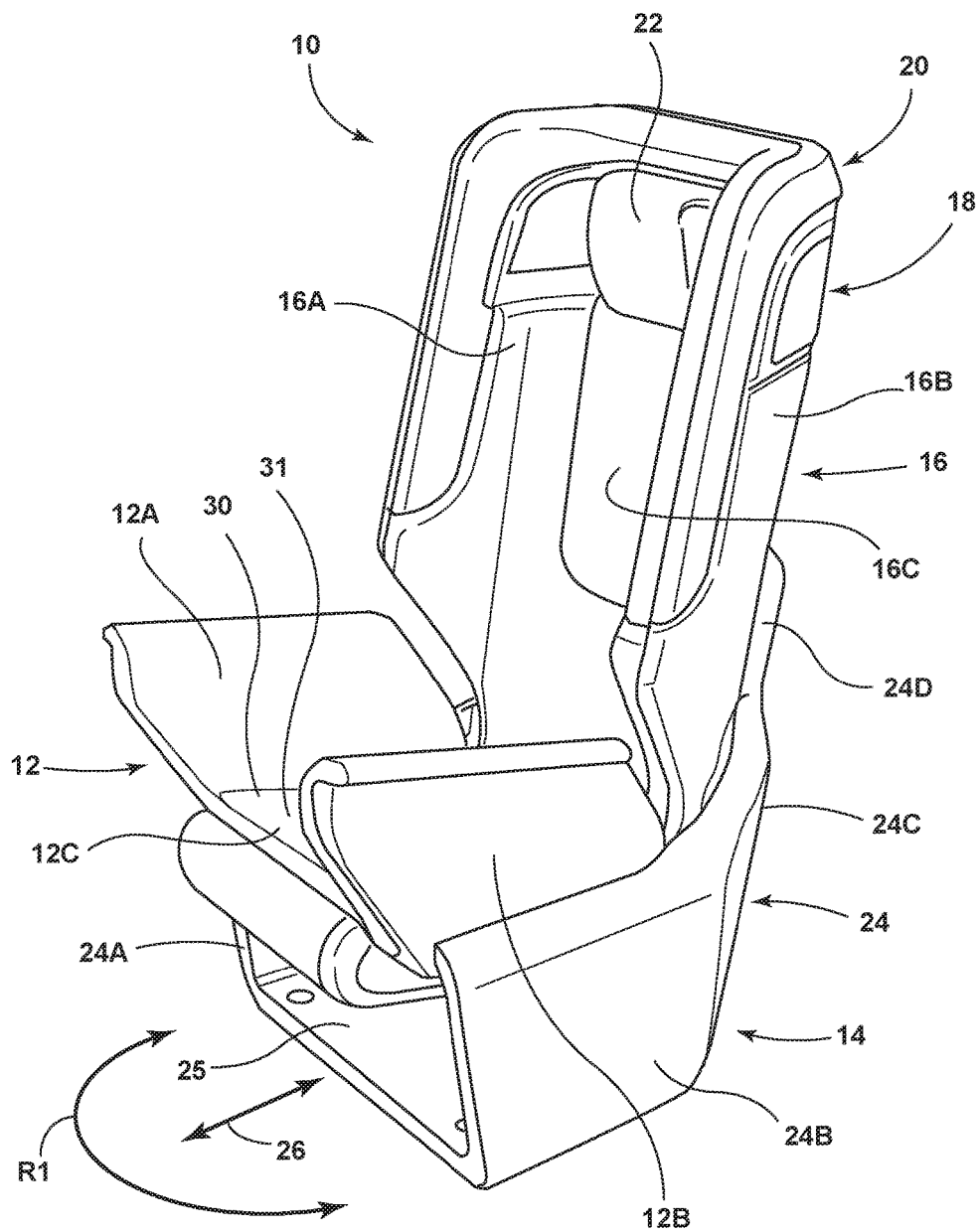
FIG. 1 is a top perspective view of a vehicle seat assembly according to an embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally indicates a seat assembly 10. The vehicle seat assembly 10 shown in FIG. 1 is a highly contoured and stylized seat assembly that is configured for use in an autonomous vehicle, but is not limited to such use. The seat assembly 10 generally includes a seat member 12 which is supported by a seat base 14. The assembly seat 10 further includes a seatback 16 which is contemplated to be vertically adjustable relative to the seat member 12 and the seat base 14. In FIG. 1, the seatback 16 is generally shown in an upright use position for properly supporting a seat occupant. The seat assembly 10 further includes a headrest assembly 18 that is integrated into the seatback 16. The headrest assembly 18 includes a wraparound base portion 19, a deployable safety halo 20 and a headrest bun 22. The base portion 19 of the headrest assembly 18 is forwardly curved to cradle the head of a seat occupant.

As further shown in FIG. 1, the seatback 16 includes first and second side bolsters 16A, 16B disposed on opposite sides of an inset central support portion 16C. The seat member 12 similarly includes first and second side bolsters 12A, 12B which outwardly extend from a generally inset central support portion 12C. The central support portion 12C of the seat member 12 has an inclined or angled support surface 30 that helps to position and retain a seat occupant in the proper seating position, such that a posterior end 42 (FIG. 4A) of a seat occupant 40 (FIG. 2) is generally positioned near the intersection of the central support portion 12C of the seat member 12 and the central support portion 16C of the seatback 16. The support surface 30 of the central support portion 12C includes a seat cover 31 which may be comprised of a flexible material, as further described below. With the first and second side bolsters 16A, 16B of the seatback 16 and the first and second side bolsters 12A, 12B of the seat member 12, the central support portions 12C, 16C of the seat member 12 and seatback 16, respectively, generally define a bucket seat configuration for the seat assembly 10 for cradling a seat occupant. The first and second side bolsters 12A, 12B of the seat member 12 and the first and second side bolsters 16A, 16B of the seatback 16 are generally configured to cooperate to properly position, support and retain a seat occupant while riding in a vehicle, such as an autonomous vehicle. The cradling features of the first and second side bolsters 12A, 12B of the seat member 12 and the first and second side bolsters 16A, 16B of the seatback 16 provide load management to keep a seat occupant in the proper seated position in the seat assembly 10 during lateral and cross-car loads. Further, these cradling features act as a pre-activated restraint system in advance of a threat. With the seat occupant guided to a proper position within the seat assembly 10, other safety features of the seat assembly 10 can operate as intended to keep the seat occupant safe during an impact event.

As further shown in FIG. 1, the seat base 14 includes a wraparound sidewall 24 that upwardly extends from a support portion 25. The wraparound sidewall 24 includes first and second side portions 24A, 24B and a rear portion 24C. The rear portion 24C includes a raised central portion 24D, and it is contemplated that one or both the rear portion 24C and the raised central portion 24D are operably coupled to the seatback 16 with a height adjustment mechanism 27 (FIG. 4A) disposed therebetween. The support portion 25 is configured to be mounted to a support surface, such as a vehicle floorboard. The support portion 25 can be mounted to a track assembly for moving the seat assembly 10 between fore and aft positions (as indicated by arrow 26), and can also be mounted on a swivel assembly to swivel the seat assembly 10 along the path as indicated by arrow R1. Thus, the seat assembly 10 can be oriented in forward facing and rearward facing directions within the interior of an autonomous vehicle, given the autonomous driving capabilities of an autonomous vehicle. As such, fixed mounting locations for safety features, such as dashboard mounted airbag systems and column mounted airbag curtains, for example, may not be effective to a seat occupant positioned in a non-forward facing direction. Thus, the safety features need to be incorporated into the seat assembly 10 to move with the seat assembly 10 and retain consistent positions relative to the seat occupant.

Figure 2:
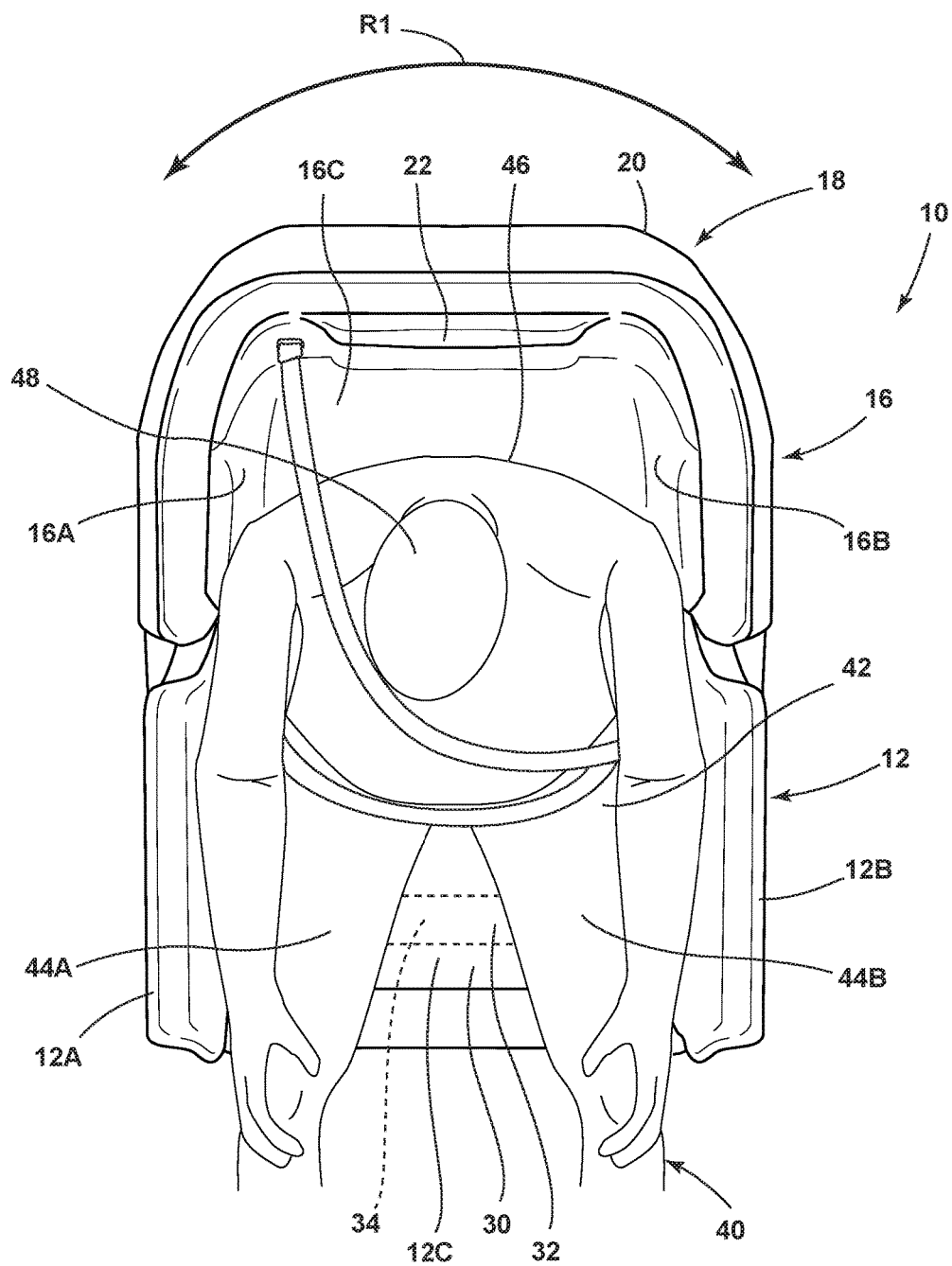
FIG. 2 is a top plan view of the vehicle seat assembly of FIG. 1 with a seat occupant seated therein.

Referring now to FIG. 2, the vehicle seat assembly 10 is shown from a top plan view with a seat occupant 40 disposed therein. As shown, the seat occupant 40 includes a posterior end 42 and thighs 44A, 44B which are supported on the central support portion 12C of the seat member 12. The seat occupant 40 further includes a torso 46 that is generally supported by the central support portion 16C of the seatback 16. A head 48 of the seat occupant 40 is disposed adjacent to the headrest assembly 18 at the headrest bun 22. The thighs 44A, 44B of the seat occupant 40 are supported on a thigh support region 32 of the support surface 30 of the central support portion 12C of the seat member 12, which is disposed along a front portion of the central support portion 12C. As further shown in FIG. 2, an airbag 34 is illustrated in phantom as being disposed within the central support portion 12C of the seat member 12. Specifically, the airbag 34 is disposed under the seat occupant's thighs 44A, 44B at the thigh support region 32 of the support surface 30 of the central support portion 12C of the seat member 12. The airbag 34 is configured to be inflated to help properly position the seat occupant 40 during an impact event, as further described below. The airbag 34 is referred to herein as an airbag, but may include any inflatable member capable of modifying an angle of the support surface 30, and may also be referred to herein as an air bladder, or other like assembly, that can be inflated and deflated repeatedly.

Figure 3:
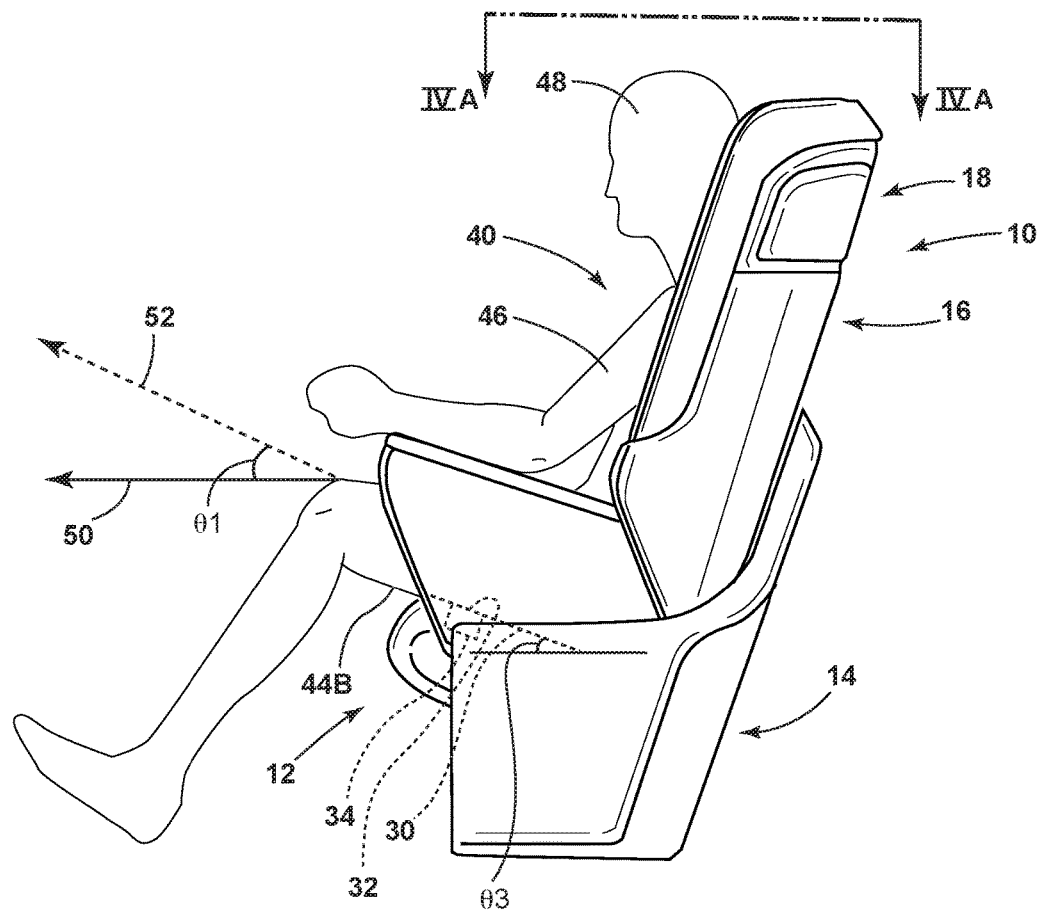
FIG. 3 is a side elevational view of the vehicle seat assembly of FIG. 2.

Referring now to FIG. 3, the seat occupant 40 is shown seated within the seat assembly 10 on the support surface 30

(shown in phantom) of the seat portion 12. In the view of FIG. 3, the seat occupant's thigh 44B is shown supported at the thigh support region 32 of the support surface 30. With the rearwardly directed slope of the support surface 30, the thighs 44A, 44B of the seat occupant 40 are disposed at an initial thigh angle θ1 shown disposed between lines 50 and 52, wherein line 50 represents a horizontal line, and line 52 represents the angled position of the thighs 44A, 44B of the seat occupant 40 as seated in the seat assembly 10. Is contemplated that the initial thigh angle θ1 may be anywhere from about 10° to about 30° in pitch relative to horizontal line 50. The angle θ3 of the support surface 30 is described herein as an inclined angle and is further described below with reference to FIG. 4A. The angle θ3 of the support surface 30 and the initial thigh angle θ1 of the seat occupant 40 supported on the support surface 30 are associated angles that may be of the same degree.

Figure 4A:
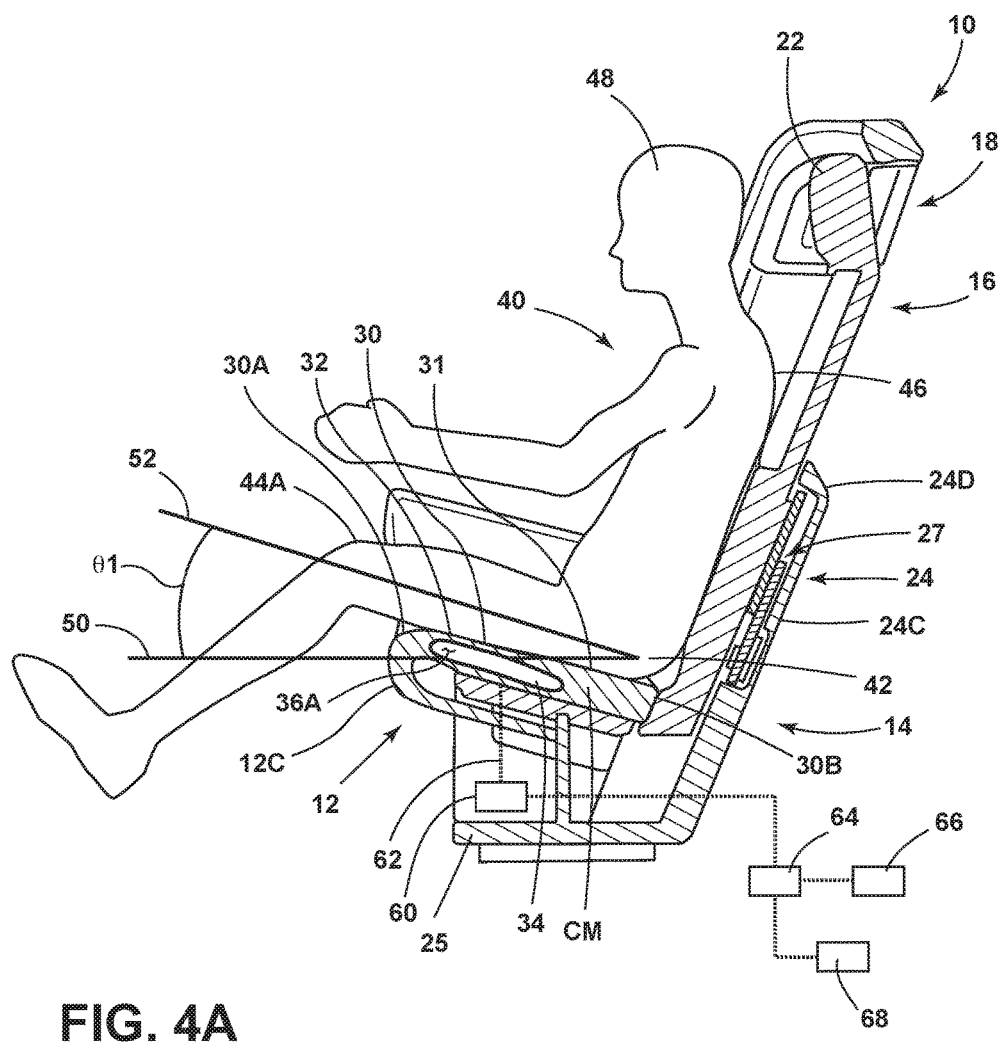
FIG. 4A is a cross-sectional view of the vehicle seat assembly of FIG. 3 taken at line IV, showing an air bag in a deflated condition.

Referring now to FIG. 4A, a cross-sectional view of the seat assembly 10 and the seat occupant 40 shows the posterior end 42 of the seat occupant 40 properly positioned near the intersection of the seat member 12 and the seatback 16. This is generally due to the consistently inclined orientation of the support surface 30 of the central support portion 12C of the seat member 12 at angle θ3. In this way, the orientation of the support surface 30 provides an anti-submarine effect for the seat occupant 40 by keeping the seat occupant 40 in an upright seated position, where the seat occupant 40 is generally retained given the rearwardly directed incline of the support surface 30. The angle θ3 (FIG. 3) of the support surface 30 is generally defined from a rear portion 30B of the support surface 30, to a front portion 30A of the support surface 30. The thigh support region 32 is positioned between the front and rear portions 30A, 30B of the support surface 30, but generally located nearer to the front portion 30A, such that the airbag 34 is positioned adjacent to the thigh support region 32 of the support surface 30. In FIG. 4A, the initial thigh angle θ1 is shown for the visible thigh 44A in the cross-sectional view of the seat occupant 40 as supported on the support surface 30. The initial thigh angle θ1 is contemplated to be equal to the initial inclined the angle θ3 (FIG. 3) of the support surface 30 of the central support portion 12C of the seat member 12. In the cross-sectional view of FIG. 4A, the airbag 34 is shown disposed within a body portion of the seat member 12 under the thigh support region 32 of the support surface 30 near the front portion 30A of the support surface 30. In FIG. 4A, the airbag 34 is shown having an at-rest interior volume 36A which is consistent with a deflated condition of the airbag 34. In the deflated condition, the airbag 34 has a negligible effect on the support surface 30, and therefore has a negligible effect on the overall position and comfort of the seat occupant 40. The airbag 34 is contemplated to be an extension of the anti-submarine ramp already provided in the seat assembly 10 by the inclined support surface 30 of the seat member 12 disposed at angle θ3.

With further reference to FIG. 4A, the airbag 34 is coupled to a pump 60 by a supply line 62. In FIG. 4A, the pump 60 is disposed within the seat base 14, however, it is contemplated that the pump 60 may be disposed in any portion of the seat assembly 10 or within a vehicle interior. The pump 60 is contemplated to be operably coupled to a controller 64 which is further coupled to a power source 66 of the vehicle within which the seat assembly 10 is disposed. The pump 60 may be a conventional air pump, a high volume air pump, a multiple pump system, or in communication with a pre-pressurized reservoir that is connected to the airbag 34 via supply line 62. The controller 64 may be located within the seat assembly 10 and is contemplated to be further coupled to one or more sensors 68 which are configured to detect a threat to the seat occupant 40 as positioned within the vehicle, such as approaching objects or adjacent vehicles detected during driving. Specifically, the one or more sensors 68 are configured to detect an impact event or sense a potential impact event with the vehicle, such that the one or more sensors 68 can send a signal to the controller 64 for processing by the controller 64. In processing the signal from the sensors 68, the controller 64 can determine that an impact event has been sensed and activate the pump 60 to which the controller 64 is operably coupled. By activating the pump 60, the controller 64 can control the inflation of the airbag 34 from the deflated condition (FIG. 4A) to an inflated condition (FIG. 4B) by pumping air to the airbag 34 via supply line 62. Further, it is contemplated that the sensors 68 could define a pre-crash detection system, wherein inflation of the airbag 34 could take place over the course of a full second, as opposed to a few milliseconds as found in conventional airbags. With the sensors 68 configured for a pre-crash system, the controller 64 can activate the pump 60 to inflate the airbag 34 before an impact event is realized, as a pre-impact event can be detected by the sensors 68 using a sensor array configured for a pre-crash detection system. Such a sensor array can include proximity sensors, heat sensors, image sensors (cameras), and any other such detection equipment. For defining such an array, it is contemplated that the sensors 68 may be disposed within the vehicle or outside of the vehicle (or both) in which the seat assembly 10 is located. The extra time for inflation provided by a pre-crash detection system before an impact event allows the air bladder 34 to be inflated using a more conventional pump system, as opposed to an explosive pump device that can be found in traditional dash-mounted airbag systems.

Figure 4B:
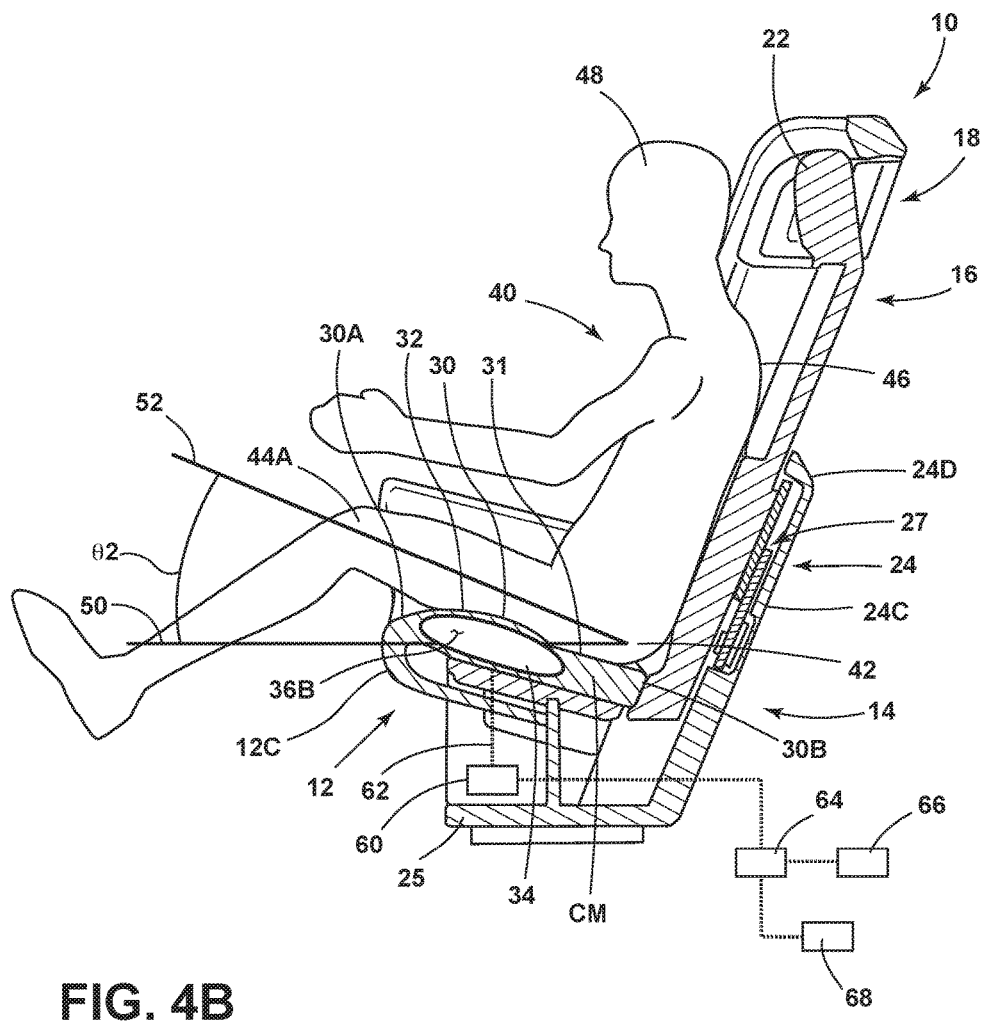
FIG. 4B is a cross-sectional view of the vehicle seat assembly of FIG. 4A showing the air bag in an inflated condition.
Figure 4C:
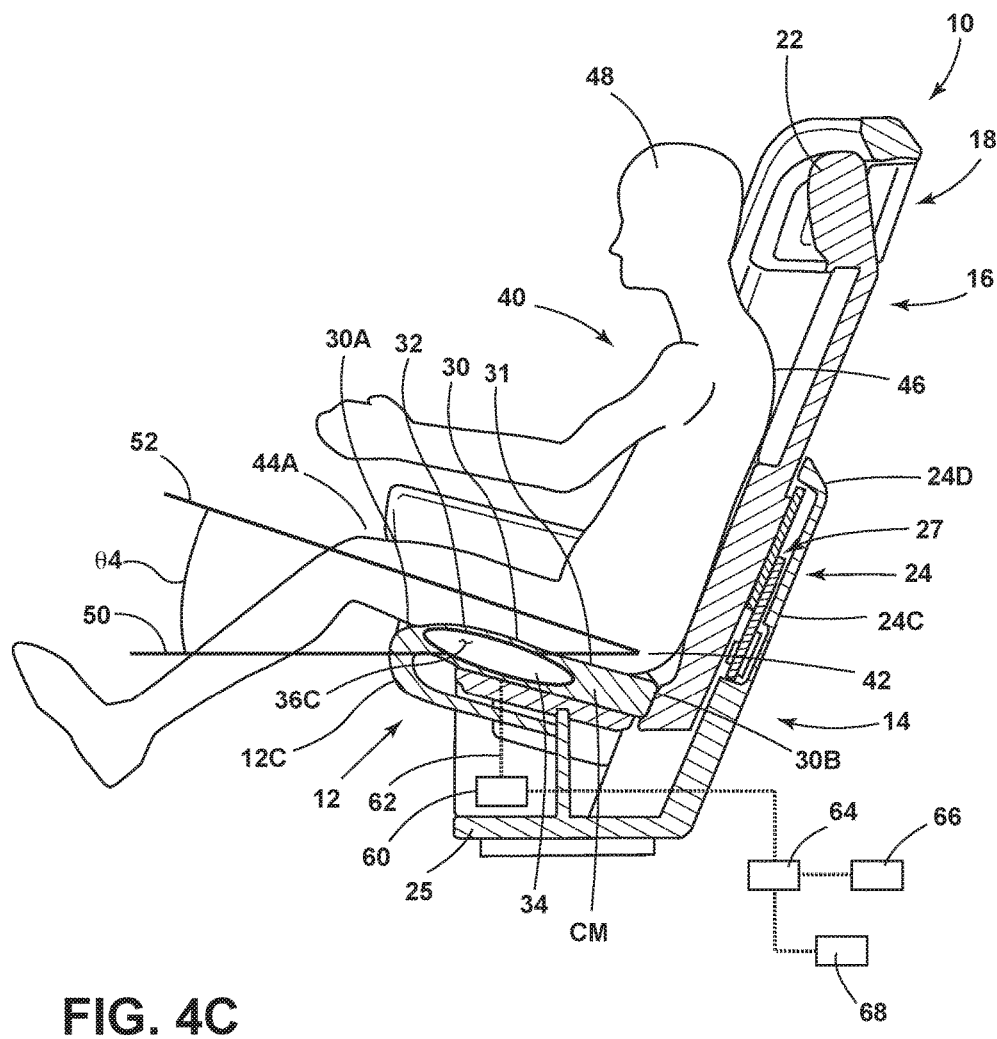
FIG. 4C is a cross-sectional view of the vehicle seat assembly of FIG. 4A showing the air bag in a partially inflated condition.

Referring now to FIG. 4B, the airbag 34 is shown in an inflated condition, wherein the airbag 34 includes an inflated interior volume 36B. The inflated interior volume 36B of the airbag 34 is greater than the at-rest interior volume 36A shown in FIG. 4A. It is contemplated that the inflated interior volume 36B can be a range of volumes from a partially inflated condition to a fully inflated condition. For purposes of this disclosure, a percentage increase from the at-rest interior volume 36A (FIG. 4A) is contemplated with the at-rest interior volume 36A being considered at an artificial baseline amount of 0%, and the inflated interior volume 36B being any amount over 0% for a partially inflated condition (FIG. 4C), and maximized at 100% for a fully inflated condition (FIG. 4B). The inflated interior volume 36B of the airbag 34 acts on the support surface 30 in an upward direction to increase the thigh angle of the seat occupant 40 from the initial thigh angle θ1 shown in FIG. 4A, to an increased thigh angle θ2 shown in FIG. 4B. The increased thigh angle θ2 is contemplated to be an increase of about 1° to about 10° relative to the initial thigh angle θ1. Thus, the increased thigh angle θ2 provides an augmented anti-submarine effect to the already inclined support surface 30 of the seat member 12. This bolstering effect further ensures that the seat occupant 40 will remain in the proper seated position with the posterior end 42 of the seat occupant 40 properly situated on the rear portion 30B of the support surface 30 adjacent the intersection of the seat member 12 and the seatback 16. Specifically, the internal deployment of the airbag 34 within the seat member 12 acts upwardly against the undersides of the vehicle occupant's thighs 44A, 44B to urge the vehicle occupant 40 towards the proper seated position within the seat assembly 10. As noted above, the thigh angle ($\theta 1$, $\theta 2$) is related to the angle $\theta 3$ of the support surface 30, such that the change in the thigh angle from the initial thigh angle $\theta 1$ to the increased thigh angle $\theta 2$ is due to a change in the inclined angle $\theta 3$ of the support surface 30. Thus, the subsequent angles $\theta 2$ and $\theta 4$ (FIGS. 4B-4C, respectively) of the support surface 30 when the airbag 34 is inflated is contemplated to be an increase of about 1° to about 10° from the initial inclined angle $\theta 3$ (FIG. 3) of the support surface 30 for altering the thigh angle ($\theta 1$ to $\theta 2$) of the seat occupant 40. Thus, the support surface 30 is disposed at a second angle $\theta 2$ and $\theta 4$ (FIGS. 4B and 4C, respectively) that is greater than the initial inclined angle $\theta 3$ (FIG. 3) when the airbag 34 is inflated to any inflation level over the at-rest or deflated inflation level as shown in FIG. 4A.

With further reference to FIGS. 4A and 4B, it is contemplated that the airbag 34 is disposed under the seat cover 31 which, as noted above, may be comprised of a flexible material, such that the seat cover 31 can flex and accommodate the increased volume of the inflated interior volume 36B of the airbag 34 when the airbag 34 is in the inflated condition. Thus, it is contemplated that the airbag 34 is an internally deployable airbag that will not rupture through the support surface 30 of the seat assembly 10 when a seat cover 31 comprised of a flexible material is used to cover the support surface 30. As used herein, the term "flexible material" is intended to include fabrics having a flexible composition, wherein the fabric can stretch to accommodate the inflated airbag 34. It is further contemplated that only a portion of the seat cover 31 may be flexible as disposed over the thigh support region 32 of the support surface 30. In this way, the seat cover 31 can be comprised of various materials, such as leather and suede, which provide the overall aesthetic desired to meet design standards, while a section of flexible material is used to cover the portion of the seat cover 31 disposed over the airbag 34. As further shown in FIGS. 4A and 4B, the central support portion 12C of the seat member 12 includes a cushion material CM that provides cushioned support for the seat occupant 40. It is contemplated that the airbag 34 may be disposed above or below the cushion material CM within the seat member 12, or may be disposed within a recess formed within the cushion material CM.

As noted above, the sensors 68 may be incorporated into a pre-crash detection system, such as that disclosed in U.S. Pat. Nos. 6,775,605 and 7,069,130, the entire contents of which are hereby incorporated by reference. Such a pre-crash detection system can include an object-classifying module that can be used to classify an object detected by the sensors 68. It is contemplated that the object-classifying module can be part of the controller 64. The object-classifying module can assess threat levels ranging from "no-threat" to "object requiring full-force airbag deployment." As used in conjunction with the present concept, a pre-crash detection system can assess an object sensed, and the controller 64 can determine if the airbag 34 should be inflated, to what degree the airbag 34 should be inflated, and how quickly the airbag 34 should be inflated. For example, various threat levels may require various levels of inflation of the airbag 34, as illustrated in Table 1 below.

TABLE 1

| Threat Level | Inflation Level (%) | Rate of Inflation |
| --- | --- | --- |
| No-threat | 0 | 0 |
| Low threat | Level 1-25% | Level 1-gradual |

TABLE 1-continued

| Threat Level | Inflation Level (%) | Rate of Inflation |
| --- | --- | --- |
| High threat | Level 2-50% | Level 2-medium |
| Object requiring full-force airbag deployment. | Level 3-100% | Level 3-rapid |

With reference to Table 1, the pump 62, or a pre-pressurized reservoir, can be activated by the controller 64 in response to a pre-crash object detection that inflates the airbag 34 to approximately a 25% inflated interior volume 36C (FIG. 4C) from the deflated or at-rest interior volume 36A (FIG. 4A) when a detected object is classified as a low threat level. This partial inflation can be a gradual inflation of about 1 or more seconds. Similarly, when an object is classified as having a high threat level, the airbag 34 can be inflated to approximately 50%. Finally, when the sensors 68 detect an imminent impact event, the airbag 34 can be fully inflated 100% which can happen rapidly for immediate deployment. With further reference to the high threat object detection, it is contemplated that the airbag 34 can be inflated to a 50% level and then be fully inflated from 50% to 100% if an impact event is sensed. The actual impact event can be sensed using a traditional impact sensor system using sensors 68, and it is further contemplated that the rate of inflation can change from a first rate (for inflating the airbag 34 from 0%-50%) to a second rate (for inflating the airbag 34 from 50% to 100%), wherein the second rate is greater than the first rate. Further, it is also contemplated that the airbag 34 may be an air bladder that is comprised of a polymeric material that can be inflated and deflated repeatedly, much like an air bladder used in a vehicle seat for positional or comfort adjustments. With such an airbag 34 in place, the airbag 34 can inflate to any one level of inflation according to any associated threat level, and then resort back to the deflated or at-rest inflation level once the threat subsides. As such, the airbag 34 is contemplated to include a vent system that can be accessed using the pump 62, or incorporated into a valve assemble that allows for the airbag 34 to deflate and reset to the at-rest ready configuration. One of ordinary skill in the art will understand that the levels identified in Table 1 are exemplary only and the inflation of the airbag 34 can be calculated in proportion to a specific threat level assessed, as opposed to pre-determined volumes identified above.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat assembly, comprising:
a seat member having a body portion with a support surface disposed at an initial inclined angle;
an airbag assembly disposed within the body portion of the seat member below the support surface, wherein the airbag is operable between fully inflated, deflated and partially inflated conditions, and further wherein the support surface is disposed at a second angle that is greater than the initial inclined angle when the airbag is in the inflated condition; and
a pre-crash detection system operably coupled to a controller which is further coupled to a pump associated with the airbag assembly, wherein the controller can control the pump to partially inflate the airbag assembly before an impact event is detected through the pre-crash detection system, and further wherein the controller can control the pump to fully inflate the airbag assembly when an impact event is detected.

2. The seat assembly of claim 1, wherein the initial inclined angle is defined from a rear portion of the support surface to a front portion of the support surface when the airbag assembly is in the deflated condition.

3. The seat assembly of claim 2, wherein the airbag assembly is positioned adjacent to a thigh support region of the support surface, and further wherein the thigh support region is positioned between the front and rear portions of the support surface.

4. The seat assembly of claim 3, including:
a seat cover covering the support surface.

5. The seat assembly of claim 4, wherein the seat cover includes a flexible portion disposed over the thigh support region.

6. The seat assembly of claim 1, including:
a seat base operably coupled to the seat member, wherein the pump associated with the airbag assembly is operably coupled to the airbag assembly by a supply line, and further wherein the pump is disposed within a portion of the seat base.

7. A seat assembly, comprising:
a seat member having a support surface, wherein the support surface is disposed at an inclined angle from a rear portion to a front portion thereof;
an airbag assembly disposed under the support surface, wherein the airbag assembly is operable between inflated and deflated conditions, and further wherein the airbag assembly increases the inclined angle of the support surface when the airbag is in the inflated condition;
a pump assembly operably coupled to the airbag assembly by a supply line;
a controller operably coupled to the pump assembly and configured to control the pump assembly; and
one or more sensors, wherein the one or more sensors are part of a pre-crash detection system, such that the controller can partially inflate the airbag assembly before an impact event is detected, and fully inflate the airbag assembly to a fully inflated condition when an impact event is detected.

8. The seat assembly of claim 7, including:
a seat cover covering the support surface.

9. The seat assembly of claim 8, wherein the seat cover is at least partially comprised of a flexible material.

10. The seat assembly of claim 7, wherein the pump assembly is configured to inflate the airbag assembly in about 1 second from the deflated condition to the fully inflated condition.

11. The seat assembly of claim 7, including:
a seat base operably coupled to the seat member, wherein the pump assembly is disposed within a portion of the seat base.

12. A seat assembly, comprising:
a seat member having a cushion material with a support surface, wherein the support surface is disposed at an inclined angle from a rear portion to a front portion thereof;
a seat cover covering the support surface;
an airbag assembly disposed below the seat cover within the cushion material at the front portion of the support surface, wherein the airbag assembly is operable between inflated and deflated conditions; and
a pre-crash detection system operably coupled to a controller which is further coupled to a pump associated with the airbag assembly, wherein the controller can control the pump to partially inflate the airbag assembly before an impact event is detected through the pre-crash detection system, and further wherein the controller can control the pump to fully inflate the airbag assembly when an impact event is detected.

13. The seat assembly of claim 12, wherein the seat cover is at least partially comprised of a flexible material.

14. The seat assembly of claim 13, wherein the seat cover retains the airbag assembly in both the inflated and deflated conditions.

15. The seat assembly of claim 12, wherein the support surface is disposed at an increased inclined angle relative to the inclined angle when the airbag assembly is in the inflated condition.

\* \* \* \* \*